(12) United States Patent
Matsui et al.

(10) Patent No.: US 9,716,292 B2
(45) Date of Patent: Jul. 25, 2017

(54) ELECTROCHEMICAL ENERGY STORAGE DEVICE

(71) Applicants: PANASONIC CORPORATION, Osaka (JP); Kyoto University, Kyoto (JP)

(72) Inventors: Toru Matsui, Osaka (JP); Toshiro Hirai, Tokyo (JP); Jun-ichi Yamaki, Kyoto (JP); Zempachi Ogumi, Kyoto (JP)

(73) Assignees: PANASONIC CORPORATION, Osaka (JP); KYOTO UNIVERSITY, Kyoto (JP)

( * ) Notice: Subject to any disclaimer, the term of this patent is extended or adjusted under 35 U.S.C. 154(b) by 12 days.

(21) Appl. No.: 15/018,304

(22) Filed: Feb. 8, 2016

(65) Prior Publication Data

US 2016/0233547 A1 Aug. 11, 2016

(30) Foreign Application Priority Data

Feb. 10, 2015 (JP) ................. 2015-024305

(51) Int. Cl.
*H01M 10/0567* (2010.01)
*H01M 10/0525* (2010.01)
*H01M 10/0568* (2010.01)

(52) U.S. Cl.
CPC ... *H01M 10/0567* (2013.01); *H01M 10/0525* (2013.01); *H01M 10/0568* (2013.01); *H01M 2300/0025* (2013.01)

(58) Field of Classification Search
CPC ......... H01M 10/0567; H01M 10/0568; H01M 10/0525; H01M 2300/0025
See application file for complete search history.

(56) References Cited

U.S. PATENT DOCUMENTS

| 2012/0082872 A1 | 4/2012 | Schmidt et al. |
| 2014/0170507 A1 | 6/2014 | Matsui et al. |
(Continued)

FOREIGN PATENT DOCUMENTS

| JP | H10-106625 A | 4/1998 |
| JP | 2004-047416 A | 2/2004 |
(Continued)

OTHER PUBLICATIONS

Co-pending U.S. Appl. No. 15/018,317, filed Feb. 8, 2016.

*Primary Examiner* — Stewart Fraser
(74) *Attorney, Agent, or Firm* — McDermott Will & Emery LLP

(57) ABSTRACT

An exemplary electrochemical energy storage device includes: a positive electrode including a positive electrode active material; a negative electrode including a negative electrode active material; and a non-aqueous electrolytic solution including LiCl, at least one of Li($XSO_2NSO_2Y$) (where X and Y are any of F, $C_nF_{2n+1}$ and $(CF_2)_m$, and $(CF_2)_m$ forms a cyclic imide anion) and $LiBF_4$, and at least one of tetrahydrofuran and a polyethylene glycol of which both terminals are alkyl groups, the non-aqueous electrolytic solution being in contact with the positive electrode and the negative electrode, wherein the positive electrode active material includes a chloride of Cu, Bi or Ag, or the negative electrode active material includes magnesium chloride.

10 Claims, 11 Drawing Sheets

(56) References Cited

U.S. PATENT DOCUMENTS

2015/0140422 A1* 5/2015 Liu ...................... H01M 4/505
  429/200
2016/0285128 A1* 9/2016 Matsui .............. H01M 10/0568

FOREIGN PATENT DOCUMENTS

| JP | 2008-171574 A | 7/2008 |
| JP | 2013-542562 A | 11/2013 |
| WO | 2013/157187 A1 | 10/2013 |

* cited by examiner

ELECTROCHEMICAL ENERGY STORAGE DEVICE

RELATED APPLICATIONS

This application claims the benefit of priority of Japanese Application No. 2015-024305, filed on Feb. 10, 2015, the disclosure of which is incorporated by reference herein.

BACKGROUND

1. Technical Field

The present application relates to an electrochemical energy storage device.

2. Description of the Related Art

In recent years, research and development for increasing the energy density of non-aqueous electrolytic solution rechargeable batteries have been increasingly extensive. The non-aqueous electrolytic solution rechargeable batteries are used as a power supply for electronic devices, such as cell phones, portable information devices, laptop computers, video cameras, handheld game consoles, etc., a power supply for driving electric tools, cleaners, robots, etc., a power supply for driving or supporting an electric motor of hybrid electric cars, plug-in hybrid electric cars, fuel cell powered cars, etc.

A possible way of increasing the energy density of the non-aqueous electrolytic solution rechargeable battery is using a material which has large electric capacity as an active material of an electrode. For example, when cupric chloride ($CuCl_2$) is used as the positive electrode active material and a lithium metal is used as the negative electrode active material, the electric capacity of 399 mAh/g can be obtained through reactions such as represented by formula (1) and formula (2). This value is equivalent to about three times the electric capacity of $Li_{0.5}CoO_2$ that is used as the positive electrode active material in lithium ion batteries of today. Note that the potentials shown at the heads of formula (1) and formula (2) are values calculated based on the standard free energies of formation of cupric chloride, cuprous chloride (CuCl), and lithium chloride (LiCl).

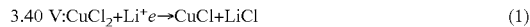

$$3.40\ V{:}CuCl_2 + Li^+ e \rightarrow CuCl + LiCl \qquad (1)$$

$$2.74\ V{:}CuCl + Li^+ e \rightarrow Cu + LiCl \qquad (2)$$

Japanese Laid-Open Patent Publication No. 2004-47416 (hereinafter, referred to as "Patent Document 1") discloses a non-aqueous electrolytic solution rechargeable battery in which cupric chloride is used for the positive electrode active material, and a fluorinated solvent is used as the solvent of the non-aqueous electrolytic solution. Patent Document 1 discloses that, for example, when electric discharge (reduction) of cupric chloride is caused in a non-aqueous electrolytic solution in which lithium hexafluorophosphate ($LiPF_6$) at the concentration of 1 M and lithium chloride (LiCl) at the concentration of 2.4 mM ("100 mg/liter" in Patent Document 1) are dissolved as the electrolyte salts with the use of trifluoropropylene carbonate (abbreviated as TFPC), the reaction of formula (2) occurs subsequent to the reaction of formula (1). Here, the reason for the use of TFPC is to suppress excessive dissolution and self-discharge of cupric chloride into the electrolytic solution.

SUMMARY

The prior art technique needs further improvement for better reaction reversibility, i.e., better reversibility in charging and discharging. A non-limiting exemplary embodiment of the present application provides an electrochemical energy storage device in which a metal chloride is used as the electrode active material and which has excellent reaction reversibility.

In one general aspect, an electrochemical energy storage device disclosed herein includes: a positive electrode including a positive electrode active material; a negative electrode including a negative electrode active material; and a non-aqueous electrolytic solution including LiCl, at least one of $Li(XSO_2NSO_2Y)$ (where X and Y are any of F, $C_nF_{2n+1}$ and $(CF_2)_m$, and $(CF_2)_m$ forms a cyclic imide anion) and $LiBF_4$, and at least one of tetrahydrofuran and a polyethylene glycol of which both terminals are alkyl groups, the non-aqueous electrolytic solution being in contact with the positive electrode and the negative electrode, wherein the positive electrode active material includes a chloride of Cu, Bi or Ag, or the negative electrode active material includes magnesium chloride.

According to the above aspect, the non-aqueous electrolytic solution has chlorine ion conductivity and can suppress dissolution of a metal chloride. Thus, an electrochemical energy storage device of high energy density is realized in which a metal chloride is used as the electrode active material.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
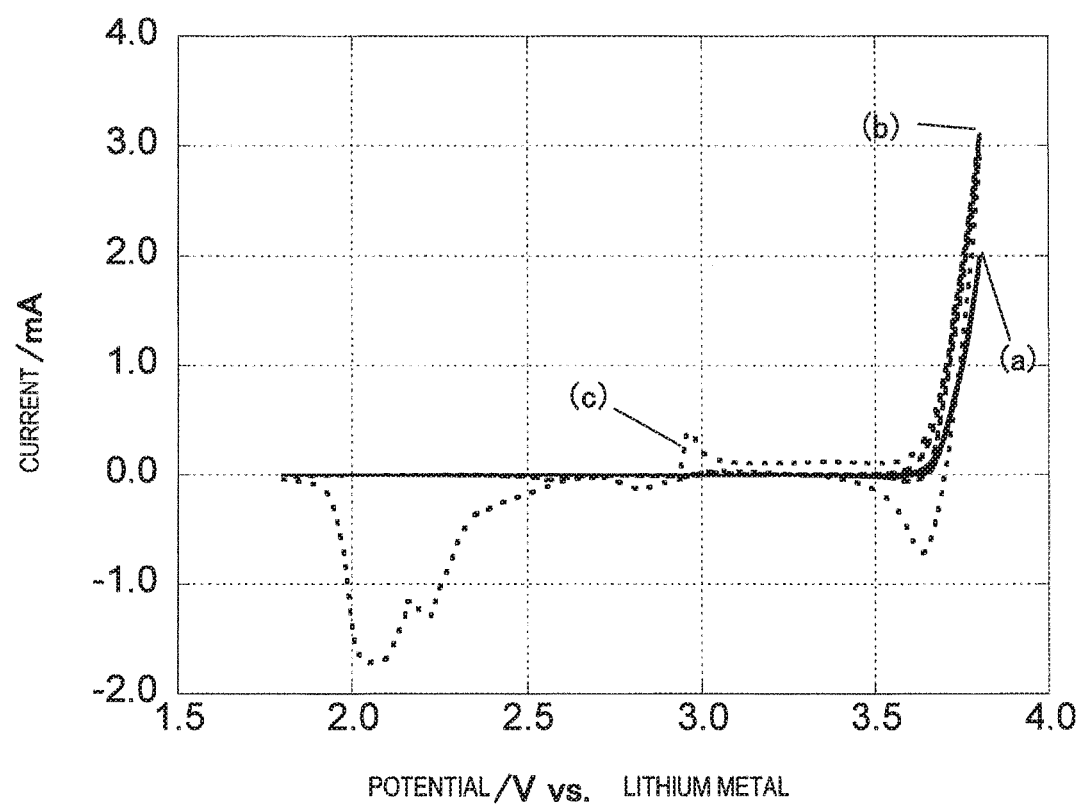
FIG. 1 shows a potential-current variation which occurred when cyclic voltammetry of a Ag wire was carried out in a LiTFSI/THF solution and LiCl/LiTFSI/THF solutions of two different concentrations.

The inventor of the present application closely examined the non-aqueous electrolytic solution rechargeable battery disclosed in Patent Document 1. In formula (1) and formula (2) shown above, a leftward reaction, i.e., a charging reaction, is unlikely to advance. This is because lithium chloride that is a product of discharge is hardly soluble in the electrolytic solution, and precipitated lithium chloride is unlikely to contribute to the leftward reactions of formulae (1) and (2).

Considering formula (1) as an example, when the battery is in an open circuit state (equilibrium state), cupric chloride, cuprous chloride and lithium chloride undergo equilibrium reactions represented by formulae (3) to (5):

$$CuCl_2 \Leftrightarrow Cu^{2+} + 2Cl^- \quad (3)$$

$$CuCl \Leftrightarrow Cu^+ + Cl^- \quad (4)$$

$$LiCl \Leftrightarrow Li^+ + Cl^- \quad (5)$$

That is, each of the substances can dissociate and emit chlorine ions. In order to advance the reaction of formula (1) leftward, it is preferred that the equilibrium reactions in formula (4) and formula (5) are shifted rightward to produce chlorine ions such that the chlorine ions can be utilized for the charging reaction of formula (1). Specifically, it is preferred that the chlorine ions are dissolved in the electrolytic solution at a sufficient concentration. Such an electrolytic solution has chlorine ion conductivity. Meanwhile, such an electrolytic solution is considered to enhance dissolution of cupric chloride produced by charging as represented by formula (3) and causes self-discharge of the battery.

There are only a few reports about a non-aqueous electrolytic solution which is capable of transfer of chlorine ions, i.e., which has chlorine ion conductivity. This is because there are only a few examples of a non-aqueous solvent which is capable of dissolving lithium chloride at high concentration. Japanese Laid-Open Patent Publication No. 10-106625 discloses an electrolytic solution which includes a phosphate ester, such as triethyl phosphate. Japanese Laid-Open Patent Publication No. 2008-171574 discloses an electrolytic solution which includes a cyclic ether, such as 1,3-dioxolane and tetrahydrofuran, and a chain ether, such as 1,2-dimethoxyethane. These electrolytic solutions further include lithium halide. However, these publications fail to disclose that these electrolytic solutions have chlorine ion conductivity.

As described above, according to the conventional technology, in realizing an electrochemical energy storage device in which, for example, a metal chloride is used as the positive electrode active material, it is difficult to restore the original metal chloride by charging because lithium chloride that is a product of discharge is hardly soluble. On the other hand, in the case of an organic solvent which dissociates the lithium chloride, the solubility of a metal chloride in the organic solvent is high so that, disadvantageously, self-discharge is likely to advance.

In view of the above problem, the inventor of the present application conceived an electrochemical energy storage device which is excellent in reaction reversibility of a metal chloride as the electrode active material. The summary of an electrochemical energy storage device according to one embodiment of the present application is as follows.

An electrochemical energy storage device according to one embodiment of the present application includes: a positive electrode including a positive electrode active material; a negative electrode including a negative electrode active material; and a non-aqueous electrolytic solution including LiCl, at least one of Li(XSO$_2$NSO$_2$Y) (where X and Y are any of F, C$_n$F$_{2n+1}$ and (CF$_2$)$_m$, and (CF$_2$)$_m$ forms a cyclic imide anion) and LiBF$_4$, and at least one of tetrahydrofuran and a polyethylene glycol of which both terminals are alkyl groups, the non-aqueous electrolytic solution being in contact with the positive electrode and the negative electrode, wherein the positive electrode active material includes a chloride of Cu, Bi or Ag, or the negative electrode active material includes magnesium chloride. According to this configuration, the solubility of an electrode active material of a metal chloride in the non-aqueous electrolytic solution decreases, while chlorine ions derived from a metal chloride produced by charging and discharging reactions can be repeatedly transferred to and from the non-aqueous electrolytic solution. Therefore, an electrochemical energy storage device, such as a non-aqueous electrolytic solution rechargeable battery or hybrid capacitor, can be realized in which a metal chloride is used for the electrode active material and which has high energy density.

The positive electrode active material may include CuCl$_2$, CuCl, AgCl or BiCl$_3$.

The negative electrode active material may include MgCl$_2$.

In the non-aqueous electrolytic solution, a molar ratio of LiCl to all lithium salts except for LiCl, including at least one of Li(XSO$_2$NSO$_2$Y) and LiBF$_4$, may be not more than 20. According to this configuration, an electrochemical energy storage device including a liquid non-aqueous electrolytic solution, which includes a lithium salt at a high concentration and which is capable of suppressing dissolution of a metal chloride in the non-aqueous electrolytic solution, can be realized.

In the non-aqueous electrolytic solution, all lithium salts including LiCl and at least one of Li(XSO$_2$NSO$_2$Y) and LiBF$_4$ may be dissolved in the non-aqueous electrolytic solution.

The non-aqueous electrolytic solution may include Li(CF$_3$SO$_2$)$_2$N and tetrahydrofuran, and a molar ratio of LiCl, Li(CF$_3$SO$_2$)$_2$N and tetrahydrofuran may be 1:4:20.

The non-aqueous electrolytic solution may include LiBF$_4$ and tetrahydrofuran, and a molar ratio of LiCl, LiBF$_4$ and tetrahydrofuran may be 1:7:20.

In the non-aqueous electrolytic solution, LiCl may be solid. The non-aqueous electrolytic solution may include Li(CF$_3$SO$_2$)$_2$N and tetrahydrofuran, and a molar ratio of LiCl, Li(CF$_3$SO$_2$)$_2$N and tetrahydrofuran may be 20:s:t (where s and t are in the ranges of $1.0 \leq s$ and $1.5 \leq t \leq 53.0$). According to this configuration, an electrochemical energy storage device can be realized which includes a non-aqueous electrolytic solution whose viscosity is from slurry to semi-solid, the non-aqueous electrolytic solution including a lithium salt at a high concentration and being capable of further suppressing dissolution of a metal chloride in the non-aqueous electrolytic solution.

Hereinafter, an embodiment of an electrochemical energy storage device according to the present disclosure is described in detail. The electrochemical energy storage device is a generic term that includes rechargeable batteries, devices which are capable of repeatedly storing charge by charging and discharging, such as capacitors, hybrid capacitors, etc., and primary batteries.

The electrochemical energy storage device of the present embodiment includes a positive electrode including a positive electrode active material, a negative electrode including a negative electrode active material, and a non-aqueous electrolytic solution which is in contact with the positive electrode and the negative electrode. At least one of the positive electrode active material and the negative electrode active material includes a metal chloride. Specifically, the positive electrode active material includes a chloride of Cu, Bi or Ag, or the negative electrode active material includes magnesium chloride. The non-aqueous electrolytic solution includes LiCl, at least one of $Li(XSO_2NSO_2Y)$ (where X and Y are any of F, $C_nF_{2n+1}$ and $(CF_2)_m$, and $(CF_2)_m$ forms a cyclic imide anion) and $LiBF_4$, and at least one of tetrahydrofuran and a polyethylene glycol of which both terminals are alkyl groups. The non-aqueous electrolytic solution that has this composition is excellent in chlorine ion conductivity. Therefore, an electrochemical energy storage device can be realized which is capable of smooth charging and discharging. Hereinafter, components of the present embodiment are described in detail.

1. Components of Electrochemical Energy Storage Device (1) Non-Aqueous Electrolytic Solution The non-aqueous electrolytic solution includes a solvent and an electrolyte. The electrolyte is dispersed or dissolved in the solvent that is liquid. The non-aqueous electrolytic solution as a whole may be a uniform solution. The solute may not be completely dissolved in the solvent so that the non-aqueous electrolytic solution as a whole has fluidity. The non-aqueous electrolytic solution may be in a slurry form which has decreased fluidity or may be a semi-solid in which the electrolyte is wet with the electrolytic solution. The non-aqueous electrolytic solution includes, as the solvent, at least one of tetrahydrofuran (abbreviated as THF) and a polyethylene glycol of which both terminals are alkyl groups. THF is capable of dissolving LiCl at a high concentration. Unlike THF, the polyethylene glycol of which both terminals are alkyl groups is not capable of dissolving LiCl at a high concentration. When the polyethylene glycol of which both terminals are alkyl groups is combined with $Li(XSO_2NSO_2Y)$ or $LiBF_4$, an electrolytic solution which has chlorine ion ($Cl^-$) conductivity can be prepared. The molecular weight of the polyethylene glycol of which both terminals are alkyl groups is approximately in the range of not less than 200 and not more than 2000 when the terminals are methyl groups. Further, the polyethylene glycol of which both terminals are alkyl groups is highly compatible with THF so that the viscosity of the non-aqueous electrolytic solution can be adjusted. The terminals of polyethylene glycol may be ethyl groups or propyl groups.

The non-aqueous electrolytic solution includes LiCl and at least one of $Li(XSO_2NSO_2Y)$ and $LiBF_4$. Here, $Li(XSO_2NSO_2Y)$ is a salt where $Li^+$ is the cation and $(XSO_2NSO_2Y)^-$ is the anion. In $(XSO_2NSO_2Y)^-$, X and Y are any of F, $C_nF_{2n+1}$ and $(CF_2)_m$. X and Y may be the same elements or may be different elements. When X is $(CF_2)_m$, it is preferred that Y is also $(CF_2)_m$. In this case, $(XSO_2NSO_2Y)^-$ forms a heterocyclic imide anion including N and S. Examples of a salt which includes a chain imide anion include $Li(FSO_2)_2N$, $Li(FSO_2)(CF_3SO_2)N$, $Li(CF_3SO_2)_2N$, $Li(C_2F_5SO_2)_2N$, and $Li(CF_3SO_2)(C_4F_9SO_2)N$. Examples of a salt which includes a cyclic imide anion include $Li(CF_2SO_2)_2N$ (which forms a five-membered ring) and $LiCF_2(CF_2SO_2)_2N$ (which forms a six-membered ring). $Li(CF_3SO_2)_2N$ (lithium bis trifluoromethane sulfonimide; hereinafter, abbreviated as LiTFSI) is the most preferred.

THF and the polyethylene glycol of which both terminals are alkyl groups dissolve LiCl. Therefore, the non-aqueous electrolytic solution of the present embodiment dissolves LiCl produced through the reactions of formula (1) and formula (2) during discharging. Since the non-aqueous electrolytic solution includes LiCl, LiCl which can be utilized in charging, i.e., in the reverse reactions of formula (1) and formula (2), can be sufficiently present in the vicinity of the positive electrode.

$Li(XSO_2NSO_2Y)$ and $LiBF_4$ enhance dissociation of LiCl in THF, or in the polyethylene glycol of which both terminals are alkyl groups, to cation and anion. This improves the reactivity of $Li^+$ and $Cl^-$ in the non-aqueous electrolytic solution, so that the reverse reactions of formula (1) and formula (2) smoothly advance.

So long as the above-described salt is included as a major constituent of the electrolyte, the non-aqueous electrolytic solution may include any other salt as an assisting agent or additive. Specifically, the non-aqueous electrolytic solution may include any other salt in the proportion of not more than 10 mol % relative to the total of LiCl and at least one of $Li(XSO_2NSO_2Y)$ and $LiBF_4$. Note that, however, a quaternary ammonium salt will increase the viscosity of the non-aqueous electrolytic solution. Therefore, a smaller content of the quaternary ammonium salt is more preferred even if it is in the above-described range of the content of any other salt. More preferably, the non-aqueous electrolytic solution does not include a quaternary ammonium salt.

In preparing a single-phase, transparent non-aqueous electrolytic solution, a non-aqueous electrolytic solution which includes, for example, THF as the solvent and LiCl and LiTFSI as the electrolyte can be prepared. In this case, it is preferred that the molar ratio of LiCl, LiTFSI and THF is 1:4:20. This mixture ratio corresponds to the best concentration with which all lithium salts can be dissolved at room temperature, so that dissolution of a metal chloride which is the electrode active material can be suppressed. The concentration of LiCl at this mixture ratio is 0.38 mol per 1 kg of the electrolytic solution.

Alternatively, a non-aqueous electrolytic solution which includes, for example, THF as the solvent and LiCl and $LiBF_4$ as the electrolyte can be prepared. In this case, it is preferred that the molar ratio of LiCl, $LiBF_4$ and THF is 1:7:20. The LiCl concentration at this mixture ratio is 0.47 mol per 1 kg of the non-aqueous electrolytic solution.

To further suppress dissolution of a metal chloride which is the electrode active material in the non-aqueous electrolytic solution, the content of the solvent in the non-aqueous electrolytic solution may be reduced such that lithium chloride and other lithium salts are present in a solid form. In this case, the non-aqueous electrolytic solution has a viscosity ranging from slurry to semi-solid. As for the mixture ratio, in the case of a combination of LiCl, LiTFSI and THF, the molar ratio of LiCl, LiTFSI and THF is preferably 20:s:t. Here, s and t satisfy $1.0 \leq s$ and $1.5 \leq t \leq 53.0$. LiTFSI is added to LiCl solvated by THF so as to dissociate $Li^+$ and $Cl^-$ ions, such that the non-aqueous electrolytic solution has the chlorine ion (Cl$^-$) conductivity, and the slurry has flexibility. When s (LiTFSI) is 1 and t (THF) is 1.5, the non-aqueous electrolytic solution is in a clay form which has substantially no fluidity. When t is 3.0, the non-aqueous electrolytic solution is in a milky-liquid form which naturally flows as slanted.

The non-aqueous electrolytic solution of the present embodiment may include the solvents shown below in addition to THF and the polyethylene glycol of which both terminals are alkyl groups. Note that, however, due to inclusion of the solvents shown below, the non-aqueous electrolytic solution has an increasing tendency to particularly dissolve a metal chloride used for the positive electrode. Thus, the solvents shown below are not more than 50 wt %, preferably not more than 30 wt %, relative to the entire electrolytic solution.

Examples of a cyclic carbonate solvent include propylene carbonate, ethylene carbonate, butylene carbonate, vinylene carbonate, vinyl ethylene carbonate, and fluoroethylene carbonate.

Examples of a cyclic ester solvent include γ-butyrolactone, α-methyl-γ-butyrolactone, γ-valerolactone, furanone, 3-methyl-2(5H)-furanone, and α-angelicalactone.

Examples of a chain carbonate solvent include dimethyl carbonate, ethyl methyl carbonate, diethyl carbonate, methyl propyl carbonate, methyl butyl carbonate, and methyl pentyl carbonate.

Examples of a cyclic ether solvent include 2-methyltetrahydrofuran, 2,5-dimethyl tetrahydrofuran, 1,3-dioxolane, 2-methyl-1,3-dioxolane, tetrahydropyran, and 2-methyl-tetrahydropyran.

Examples of a chain ether solvent include diethyl ether, methyl butyl ether, 1-methoxy-2-ethoxyethane, and 1,2-diethoxyethane.

Examples of a nitrile solvent include acetonitrile, propionitrile, and adiponitrile.

Examples of an organic solvent which includes a nitrogen or sulfur element include N-methyl pyrrolidone and dimethyl sulfoxide.

Among the above-described solvents, cyclic carbonates, chain carbonates, cyclic ethers, and chain ethers are preferred.

These solvents may be solely used. Alternatively, some of these solvents may be used in mixture.

(2) Positive Electrode and Negative Electrode

In a non-aqueous electrolytic solution rechargeable battery of the present disclosure, a metal chloride is used as an active material in at least one of the positive electrode and the negative electrode. Specifically, the positive electrode active material includes a chloride of Cu, Bi or Ag, or the negative electrode active material includes magnesium chloride. Specifically, when the battery is in a charged state, the positive electrode active material is any of copper chloride (CuCl or $CuCl_2$), bismuth chloride ($BiCl_3$) and silver chloride (AgCl). When the battery is in a discharged state, the negative electrode active material is magnesium chloride ($MgCl_2$). These metal chlorides are in an equilibrium relationship with chlorine ions or lithium ions in the electrolytic solution as represented by formulae (1) to (5) shown above, and when the battery is charged, active material particles decrease to very fine particles, and therefore, they are sometimes difficult to detect as the original metal chloride. Particularly in the case of copper chloride or bismuth chloride, it is difficult to specify a crystalline form in a charged state.

The metal chloride used in the positive electrode is reduced when the battery is discharged, so as to definitely produce any metal of Cu, Bi and Ag. In magnesium chloride ($MgCl_2$) used in the negative electrode, a Mg metal is definitely detectable after magnesium chloride is reduced through charging.

In the case where a metal chloride is used in the positive electrode active material and a non-aqueous electrolytic solution rechargeable battery is manufactured as the electrochemical energy storage device, materials which can be used as the negative electrode active material other than the aforementioned metal chlorides include alkali metals such as lithium, alkaline earth metals such as magnesium, intercalation compounds of lithium and graphite such as employed in lithium ion batteries, and alloys and oxides including lithium. The alloys include, for example, silicon, tin, lead or bismuth as a constituent. The oxides include, for example, silicon or tin as a constituent.

In the case where a hybrid capacitor is manufactured as the electrochemical energy storage device, a carbon material which is capable of storing electric double layer capacity can also be used for the negative electrode material. The carbon material includes activated carbons. The activated carbons include natural plant activated carbons such as coconut shells, synthetic resin activated carbons such as phenols, and fossil fuel activated carbons such as cokes. Also, an ultrafine powder activated carbon obtained by activating carbon black may be used.

In the case where a metal chloride is used in the negative electrode active material and a non-aqueous electrolytic solution rechargeable battery is manufactured as the electrochemical energy storage device, materials which can be used as the positive electrode active material other than the aforementioned metal chlorides include oxides which are capable of insertion and release of alkali metal ions, such as $LiCoO_2$, $LiNiO_2$, $Li(Ni_{1/3}Mn_{1/3}Co_{1/3})O_2$, $LiMn_2O_4$, $Li(Li_xMn_{1-x})O_2$, and $LiFePO_4$. On the other hand, in the case where a hybrid capacitor is assembled, carbon materials, such as activated carbons, can also be used as in the previously-described examples.

The positive electrode and the negative electrode of the electrochemical energy storage device of the present embodiment may be formed by a positive electrode composite and a negative electrode composite including the above-described metal chloride and a collector. For example, when a metal chloride is used in the positive electrode active material, the positive electrode composite can be formed by mixing together the above-described metal chloride, an electrically-conductive assisting agent such as acetylene black, and a binder such as polyvinylidene fluoride. These powders may be molded after the powders themselves have been mixed together or may be dispersed or dissolved in a solvent such as N-methyl-2-pyrrolidone (NMP) and applied over the collector. For the collector, carbon, molybdenum, tungsten, gold, platinum, or the like, can be used.

When a metal chloride is used in the negative electrode active material, the negative electrode composite can be formed by mixing together powder of the above-described metal chloride, an electrically-conductive assisting agent such as nickel, and a binder such as polybutadiene. These powders may be molded after the powders themselves have been mixed together or may be dispersed or dissolved in a solvent such as acetonitrile and applied over the collector. For the collector, carbon, iron, nickel, copper, or the like, can be used. Alternatively, the negative electrode may be formed by pouring powder of the above-described metal chloride into the pores of an electrically-conductive porous material such as nickel.

(3) Separator

The electrochemical energy storage device of the present embodiment is capable of charging and discharging so long as the positive electrode and the negative electrode are electrically separated from each other and the non-aqueous electrolytic solution is kept in contact with the positive electrode and the negative electrode. For practical reasons, in order to realize an electrochemical energy storage device in a stable form, the electrochemical energy storage device may further include a separator, such as those commonly used in rechargeable batteries. The separator is a resin layer which is made of a resin which does not have electron conductivity, and is a microporous film which has high ion permeability and which has predetermined mechanical strength and electrical insulation. The separator is preferably made of a material which is resistant to the above-described non-aqueous electrolytic solution. For example, a polyolefin resin can be used which is made of any, or a combination, of polypropylene, polyethylene, etc., such as those commonly used in lithium rechargeable batteries.

(4) Configuration of Entire Electrochemical Energy Storage Device

Figure 11:
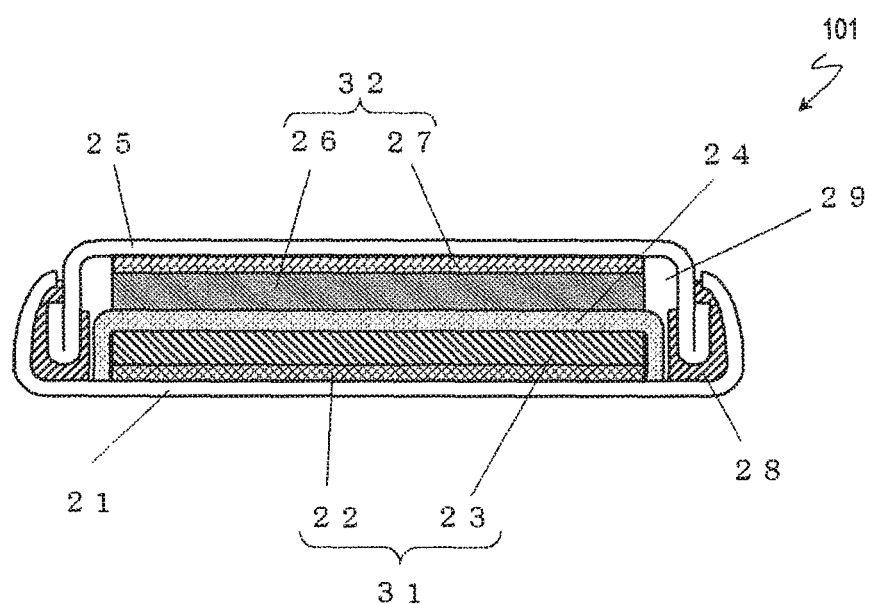
FIG. 11 is a cross-sectional view showing an embodiment of a coin-shaped non-aqueous electrolytic solution rechargeable battery.

An example which constitutes a rechargeable battery as the electrochemical energy storage device is described. FIG. 11 is a cross-sectional view showing an example of a coin-shaped rechargeable battery 101 that is one of the electrochemical energy storage device. The coin-shaped rechargeable battery 101 shown in FIG. 11 includes a positive electrode 31, a negative electrode 32, and a separator 24. The positive electrode 31 includes a positive electrode active material layer 23 and a positive electrode collector 22 which is in contact with the positive electrode active material layer 23. The negative electrode 32 includes a negative electrode active material layer 26 and a negative electrode collector 27 which is in contact with the negative electrode active material layer 26. At least one of the positive electrode active material layer 23 and the negative electrode active material layer 26 includes the above-described metal chloride.

The positive electrode 31 and the negative electrode 32 constitute an electrode group in which the positive electrode active material layer 23 and the negative electrode active material layer 26 oppose each other via the separator 24 so as to be in contact with the separator 24.

The electrode group is housed in a space inside a case 21. The space inside the case 21 is filled with the above-described non-aqueous electrolytic solution 29. The positive electrode 31, the negative electrode 32, and the separator 24 are impregnated with the non-aqueous electrolytic solution 29. The separator 24 has minute spaces for retaining the non-aqueous electrolytic solution 29. Therefore, the non-aqueous electrolytic solution 29 is retained in the minute spaces, so that the non-aqueous electrolytic solution 29 is present between the positive electrode 31 and the negative electrode 32. The opening of the case 21 is closed by a closure plate 25 using a gasket 28.

Although an embodiment of the coin-shaped rechargeable battery is shown in FIG. 11, the electrochemical energy storage device of the present embodiment may have any other shape. For example, the electrochemical energy storage device may have a cylindrical or polygonal shape. Alternatively, the electrochemical energy storage device may have a large size for use in electric cars or the like.

2. Electrode Reaction in Electrochemical Energy Storage Device

Next, a major reaction form in a non-aqueous electrolytic solution rechargeable battery that is the electrochemical energy storage device of the present embodiment is described with an example where $BiCl_3$ is used as the positive electrode active material and an example where $MgCl_2$ is used as the negative electrode active material.

(A) Discharging Reaction of $BiCl_3//Mg$ Battery $$\text{POSITIVE ELECTRODE: } BiCl_3 + 3Li^+ + 3e \rightarrow Bi + 3LiCl \tag{6}$$

Since produced LiCl dissociates, $$3LiCl \rightarrow 3Li^+ + 3Cl^- \tag{7}$$

$$\text{NEGATIVE ELECTRODE: } 1.5Mg + 3Cl^- \rightarrow 1.5MgCl_2 + 3e \tag{8}$$

Adding together formulae (6) to (8) leads to formula (9) that represents the total discharging reaction.

$$\text{TOTAL: } BiCl_3 + 1.5Mg \rightarrow Bi + 1.5MgCl_2 \tag{9}$$

Formula (9) is in such a form that chlorine transfers from the positive electrode active material to the negative electrode active material. In this battery, the reverse reaction of formula (9) occurs when the battery is charged.

Note that adding together formula (6) and formula (7) leads to formula (10) that represents a reaction of the positive electrode which occurs when the battery is discharged, which represents transfer of chlorine ions to and from the positive electrode.

$$\text{POSITIVE ELECTRODE: } BiCl_3 + 3e \rightarrow Bi + 3Cl^- \tag{10}$$

(B) Charging Reaction of $Bi//MgCl_2$ Battery $$\text{NEGATIVE ELECTRODE: } 1.5MgCl_2 + 3Li^+ + 3e \rightarrow 1.5Mg + 3LiCl \tag{11}$$

Since produced LiCl dissociates, $$3LiCl \rightarrow 3Li^+ + 3Cl^- \tag{12}$$

$$\text{POSITIVE ELECTRODE: } Bi + 3Cl^- \rightarrow BiCl_3 + 3e \tag{13}$$

Adding together formulae (11) to (13) leads to formula (14) that represents the total charging reaction.

$$\text{TOTAL: } Bi + 1.5MgCl_2 \rightarrow BiCl_3 + 1.5Mg \tag{14}$$

Formula (14) is in such a form that chlorine transfers from the negative electrode active material to the positive electrode active material. In this battery, the reverse reaction of formula (14) occurs when the battery is discharged.

Note that adding together formula (11) and formula (12) leads to formula (15) that represents a reaction of the negative electrode which occurs when the battery is charged, which represents transfer of chlorine ions to and from the negative electrode.

$$\text{NEGATIVE ELECTRODE: } 1.5MgCl_2 + 3e \rightarrow 1.5Mg + 3Cl^- \tag{15}$$

(C) Discharging Reaction of $BiCl_3//Li$ Battery $$\text{POSITIVE ELECTRODE: } BiCl_3 + 3Li^+ + 3e \rightarrow Bi + 3LiCl \tag{16}$$

$$\text{NEGATIVE ELECTRODE: } 3Li \rightarrow 3Li^+ + 3e \tag{17}$$

Adding together formulae (16) and (17) leads to formula (18) that represents the total discharging reaction.

$$\text{TOTAL: } BiCl_3 + 3Li \rightarrow Bi + 3LiCl \tag{18}$$

As seen from formula (16) and formula (17), when a lithium metal is used for the negative electrode active material, lithium ions are produced at the negative electrode by discharging while lithium ions are used at the positive electrode, the non-aqueous electrolytic solution functions as an electrolytic solution which has lithium ion conductivity. Although formula (18) is in such a form that chlorine transfers from the positive electrode active material to the negative electrode active material, LiCl after the discharge is present in the positive electrode. However, formula (6) and formula (16) are the same. For example, dissociation of lithium chloride is still important in the leftward reaction of formula (16), i.e., in charging. In this battery, the reverse reaction of formula (18) occurs when the battery is charged.

(D) Charging Reaction of $LiCoO_2//MgCl_2$ Battery

POSITIVE ELECTRODE: $4LiCoO_2 \rightarrow 4Li_{0.5}CoO_2 + 2Li^+ + 2e$ (19)

NEGATIVE ELECTRODE: $MgCl_2 + 2Li^+ + 2e \rightarrow Mg + 2LiCl$ (20)

Adding together formulae (19) and (20) leads to formula (21) that represents the total charging reaction.

TOTAL: $4LiCoO_2 + MgCl_2 \rightarrow 4Li_{0.5}CoO_2 + Mg + 2LiCl$ (21)

When lithium cobaltate ($LiCoO_2$) is used for the positive electrode active material, the non-aqueous electrolytic solution of the present disclosure has lithium ion conductivity. LiCl produced by the reaction of formula (20) is present in the negative electrode. However, formula (11) and formula (20) are the same. For example, dissociation of lithium chloride is still important in the leftward reaction of formula (20).

In this battery, the reverse reaction of formula (21) occurs when the battery is discharged.

Thus, according to the present embodiment, the non-aqueous electrolytic solution includes at least one of THF which dissolves lithium chloride and polyethylene glycol of which both terminals are alkyl groups, LiCl, and at least one of $Li(XSO_2NSO_2Y)$ (where X and Y are any of F, $C_nF_{2n+1}$ and $(CF_2)_m$, and $(CF_2)_m$ forms a cyclic imide anion) and $LiBF_4$. Therefore, the non-aqueous electrolytic solution is excellent in transfer of chlorine ions and has high chlorine ion conductivity. Since lithium imides and $LiBF_4$ are unlikely to decompose THF, the prepared electrolytic solution is stable for a long period of time.

Further, since the non-aqueous electrolytic solution dissolves lithium chloride at a high concentration and THF is used for solvation of lithium chloride, the non-aqueous electrolytic solution only includes a small amount of THF which can be utilized for dissolution of a metal chloride that is an electrode active material. Therefore, dissolution of the metal chloride in the non-aqueous electrolytic solution can be suppressed, and self-discharge of the battery can be prevented.

Thus, even when a metal chloride is used for the electrode active material, using the non-aqueous electrolytic solution of the present embodiment enables to reduce the solubility of the metal chloride and to repeatedly transfer chlorine ions derived from a metal chloride produced by charging and discharging reactions. Therefore, an electrochemical energy storage device, such as a non-aqueous electrolytic solution rechargeable battery or hybrid capacitor, can be realized in which a metal chloride is used for the electrode active material and which has high energy density.

Although in the present embodiment the electrochemical energy storage device has been described with an example of a rechargeable battery, the electrochemical energy storage device may be a primary battery. Conventionally, in primary batteries in which a metal halide, particularly a highly-soluble metal chloride, is used, the electrode active material and the electrolytic solution are brought into contact with each other immediately before use as seen in liquid-injected batteries. According to the present embodiment, a metal halide as the electrode active material and an ionic liquid are brought into contact with each other. Even in a state where a primary battery is completed, the metal halide is unlikely to be dissolved in the ionic liquid, and therefore, deterioration of the characteristics of the primary battery is suppressed.

The electrochemical energy storage device of the present disclosure is specifically described below with actual examples. Note that all experiments were carried out at room temperature in a glove box filled with an argon atmosphere.

Example 1

The present inventors verified that a solution in which lithium chloride (LiCl; manufactured by Aldrich) and lithium bis(trifluoromethanesulfonyl)imide (abbreviated as LiTFSI; manufactured by KISHIDA CHEMICAL Co., Ltd.) are dissolved has chlorine ion ($Cl^-$) conductivity.

As a solvent which dissolves both lithium salts, tetrahydrofuran (abbreviated as THF; manufactured by Wako Pure Chemical Industries, Ltd.) was used. The constituents were mixed in the following molar ratios. In each case, a single-phase, transparent solution was prepared.

(a) LiCl:LiTFSI:THF=0.0:4:20 (comparative example)
(b) LiCl:LiTFSI:THF=0.01:4:20
(c) LiCl:LiTFSI:THF=0.1:4:20
(d) LiCl:LiTFSI:THF=0.2:4:20
(e) LiCl:LiTFSI:THF=0.5:4:20
(f) LiCl:LiTFSI:THF=0.8:4:20
(g) LiCl:LiTFSI:THF=1.0:4:20

The working electrode used was a silver wire with a diameter of 1 mm (manufactured by The Nilaco Corporation). Two nickel net collectors covered with lithium foil (manufactured by Honjo Metal Co., Ltd.) were prepared and used as the reference electrode and the counter electrode.

The three electrodes were immersed in solutions (a) to (g), and cyclic voltammetry was performed. Measurement conditions were the sweep rate of 1 mV/sec and the sweep range of 1.8 to 3.8 V.

Figure 2:
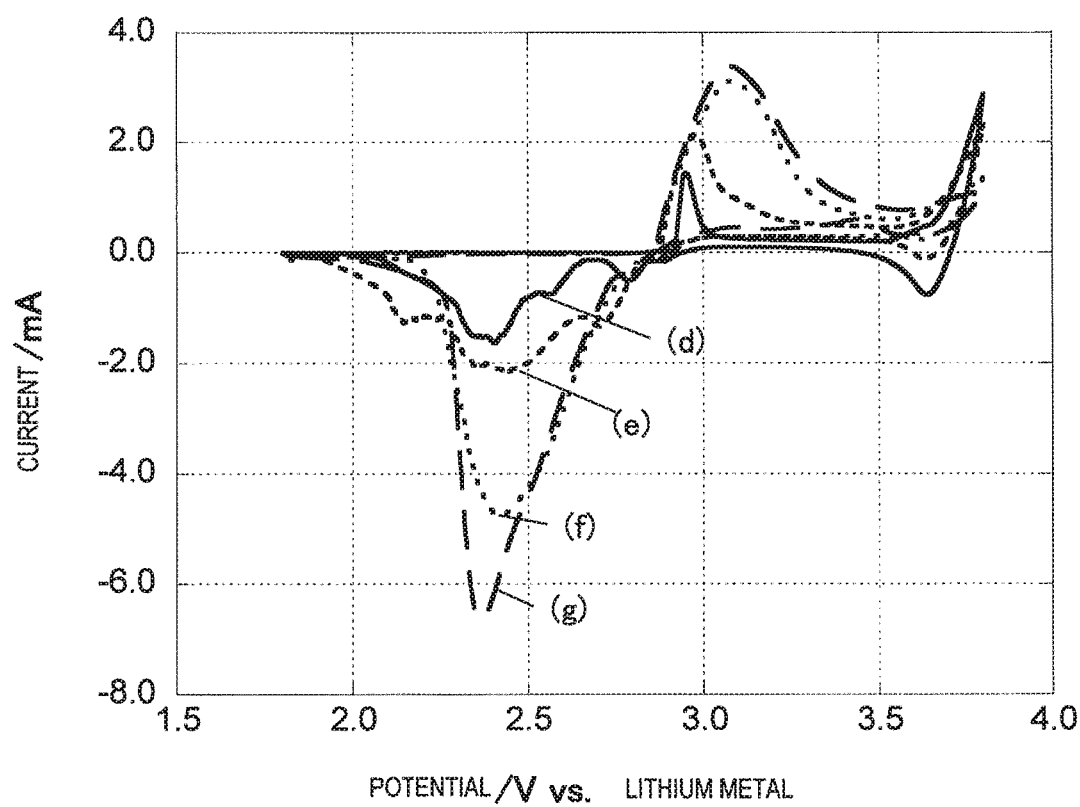
FIG. 2 shows a potential-current variation which occurred when cyclic voltammetry of a Ag wire was carried out in LiCl/LiTFSI/THF solutions of four different concentrations.

FIG. 1 shows a record of waveforms of the third cycle in solutions (a) to (c) in the cyclic voltammetry. FIG. 2 shows a record of waveforms in solutions (d) to (f) under the same conditions.

In solution (a) that did not include LiCl, an oxidation current started to flow near about 3.6 V, and dissolution of the silver wire through the reaction shown below was found.

$Ag \rightarrow Ag^+ + e$ (22)

In solution (c), an oxidation current definitely rising at about 2.9 V was detected, while it is small in solution (b). This current corresponds to a reaction shown below which produces silver chloride (AgCl).

$2.85\ V: Ag + Cl^- \rightarrow AgCl + e$ (23)

In solutions (d) to (g), as the LiCl concentration in the solution increases, the oxidation current of formula (22) is more suppressed. Production of AgCl which is represented by formula (23) and whose peak is seen in a range of about 2.9 V to 3.1 V and a corresponding reduction current which is the reverse reaction of formula (23) and whose peak is seen in a range of about 2.3 V to 2.4 V were dominant.

It can be seen from the above results that the non-aqueous electrolytic solution used in the present embodiment has chlorine ion (Cl⁻) conductivity, and transfer of Cl⁻ to and from silver chloride (AgCl) that is the positive electrode active material is possible. It can also be seen that the chlorine ion conductivity exhibited depends on the concentration of LiCl.

Example 2

The present inventors verified that a solution in which lithium chloride (LiCl; manufactured by Aldrich) and lithium tetrafluoroborate (LiBF$_4$; manufactured by KISHIDA CHEMICAL Co., Ltd.) are dissolved has chlorine ion (Cl⁻) conductivity.

As a solvent which dissolves both lithium salts, tetrahydrofuran (abbreviated as THF; manufactured by Wako Pure Chemical Industries, Ltd.) was used. The constituents were mixed in the following molar ratio, whereby a single-phase, transparent solution was prepared.

(h) LiCl:LiBF$_4$:THF=1:7:20

The working electrode used was a silver wire with a diameter of 1 mm (manufactured by The Nilaco Corporation). Two nickel net collectors covered with lithium foil (manufactured by Honjo Metal Co., Ltd.) were prepared and used as the reference electrode and the counter electrode.

The three electrodes were immersed in solution (h), and cyclic voltammetry was performed. Measurement conditions were the sweep rate of 1 mV/sec and the sweep range of 1.8 to 3.8 V.

Figure 3:
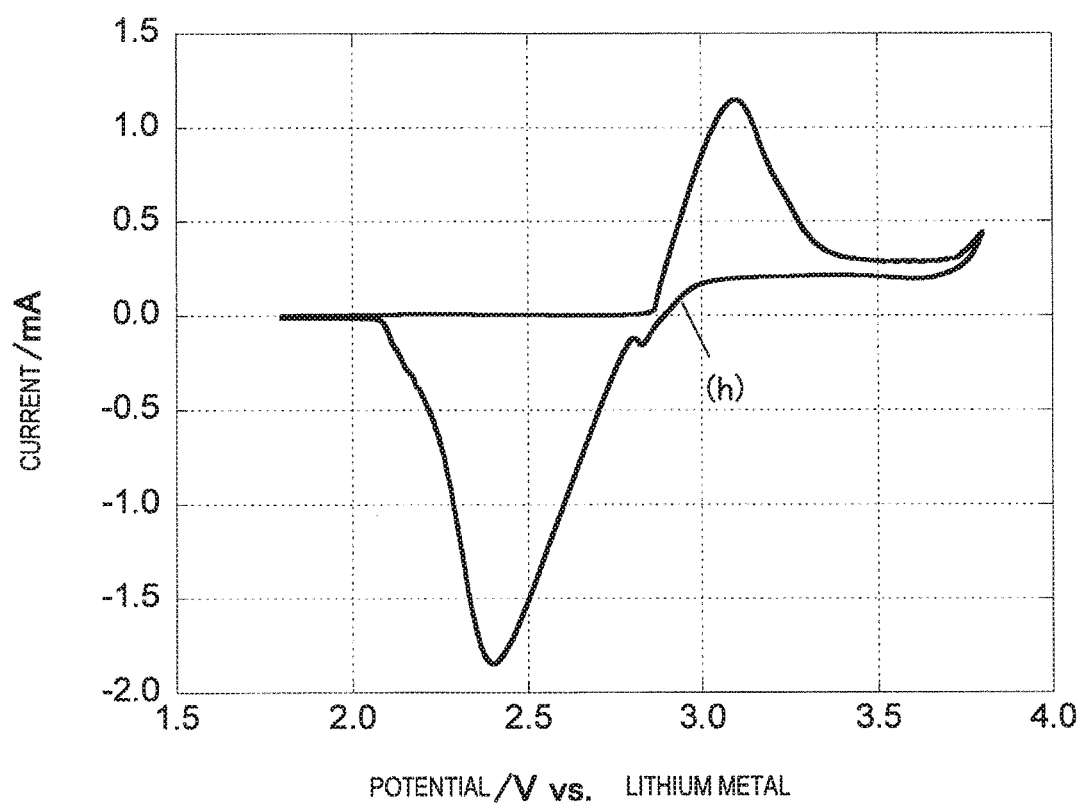
FIG. 3 shows a potential-current variation which occurred when cyclic voltammetry of a Bi wire was carried out in a LiCl/LiBF$_4$/THF solution.

FIG. 3 shows a record of waveforms of the third cycle in the cyclic voltammetry. In solution (h), an oxidation current corresponding to formula (23) and a reduction current to silver which is point-symmetrical with the oxidation current about 2.85 V (corresponding to the reverse reaction of formula (23)) are flowing.

It can be seen that the non-aqueous electrolytic solution used in the present embodiment has chlorine ion (Cl⁻) conductivity, and transfer of Cl⁻ to and from silver chloride (AgCl) that is the positive electrode active material is possible.

Example 3

Solution (g) prepared in Example 1 (LiCl:LiTFSI:THF=1:4:20) was used as the electrolytic solution. The present inventors verified that reduction of magnesium chloride (MgCl$_2$) to a magnesium metal (Mg) and oxidation of produced Mg are possible.

A composite electrode including magnesium chloride was formed as described hereinafter. Magnesium chloride (MgCl$_2$; manufactured by Aldrich) was pounded in a mortar and mixed with acetylene black (abbreviated as AB; manufactured by Denka Company Limited). The resultant mixture was molded into a composite sheet using polybutadiene (abbreviated as PB; manufactured by Aldrich) as the binder. The composition of the composite sheet is MgCl$_2$:AB:PB=85:10:5 in weight ratio. A disk with a diameter of 5 mm was punched out from this composite sheet and joined by compression with a nickel net of 100 meshes. The resultant disk was used as the working electrode.

Two nickel net collectors covered with lithium foil were prepared and used as the reference electrode and the counter electrode.

The three electrodes were immersed in an electrolytic solution. A reduction current of 0.3 mA was supplied to flow through the working electrode such that the amount of electricity was about 140 mAh/g per weight of MgCl$_2$. After a pause of 10 minutes, an oxidation current of 0.3 mA was supplied to flow till the potential of the working electrode reached 2.0 V.

Figure 4:
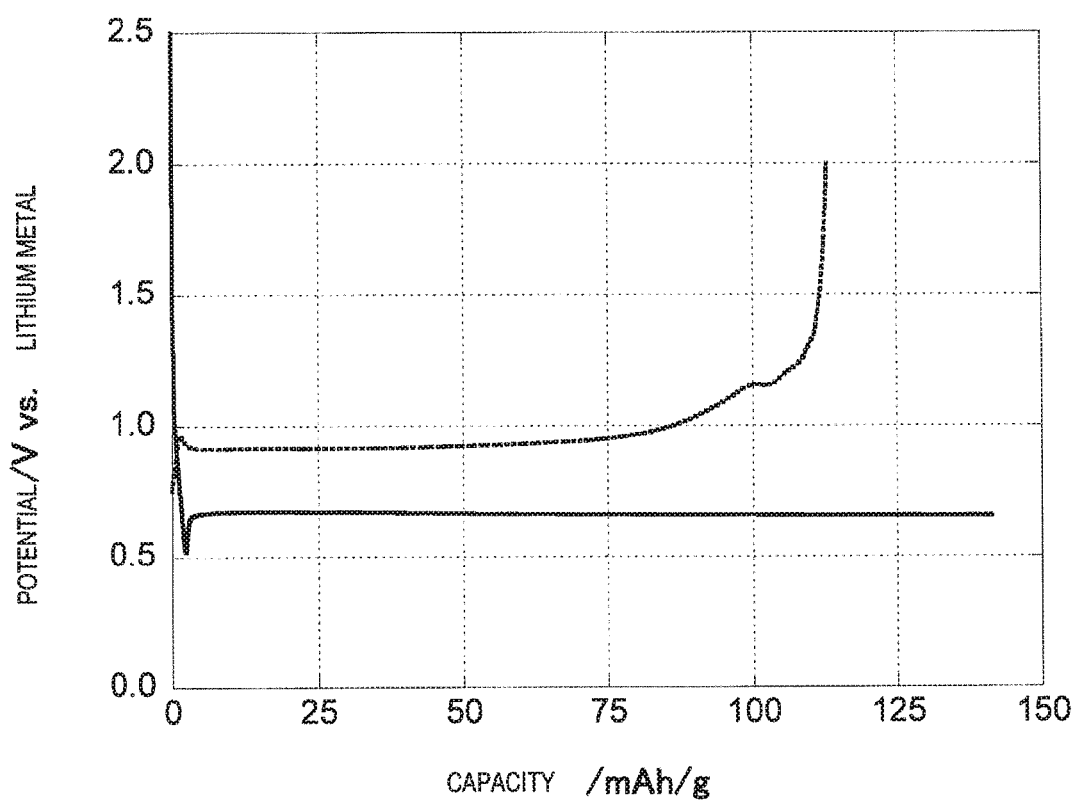
FIG. 4 shows a potential-current variation which occurred when constant current reduction and oxidation of a magnesium chloride ($MgCl_2$) electrode were carried out in a LiCl/LiTFSI/THF solution.

FIG. 4 shows a record of the potential variation at the working electrode in the measurement. The solid line represents a potential variation which occurred in a case where a reduction current was supplied to flow through the working electrode. The dotted line represents a potential variation which occurred in a case where an oxidation current was supplied to flow through the working electrode. The potential at which magnesium (Mg) metal releases and receives chlorine ions (Cl⁻) can be calculated by formula (24). It can be seen that the potential variations of FIG. 4 occurred according to formula (24).

$$0.917\ \text{V:MgCl}_2+2\text{Li}\rightarrow\text{Mg}+2\text{LiCl} \qquad (24)$$

Example 4

A battery was assembled using a silver (Ag) plate as the positive electrode, a composite electrode of magnesium chloride (MgCl$_2$) as the negative electrode, and solution (g) prepared in Example 1 (LiCl:LiTFSI:THF=1:4:20) as the electrolytic solution.

The silver plate (manufactured by The Nilaco Corporation) was a disk with a diameter of 14.8 mm. The composite electrode of magnesium chloride was a disk with a diameter of 15.8 mm, which was formed in the same way as Example 3.

Two separators were used. The separator on the positive electrode side was a polypropylene porous film. The separator on the negative electrode side was glass filter paper (manufactured by ADVANTEC).

These electrodes, separators and electrolytic solution were assembled in a mock battery case (manufactured by EC Frontier Co, Ltd.).

A charge current of 30 mA was supplied to flow such that the amount of electricity was about 140 mAh/g per weight of MgCl$_2$. Subsequently, a discharge current of the same value, 30 mA, was supplied to flow till the voltage of the battery reached 1.0 V.

Figure 5:
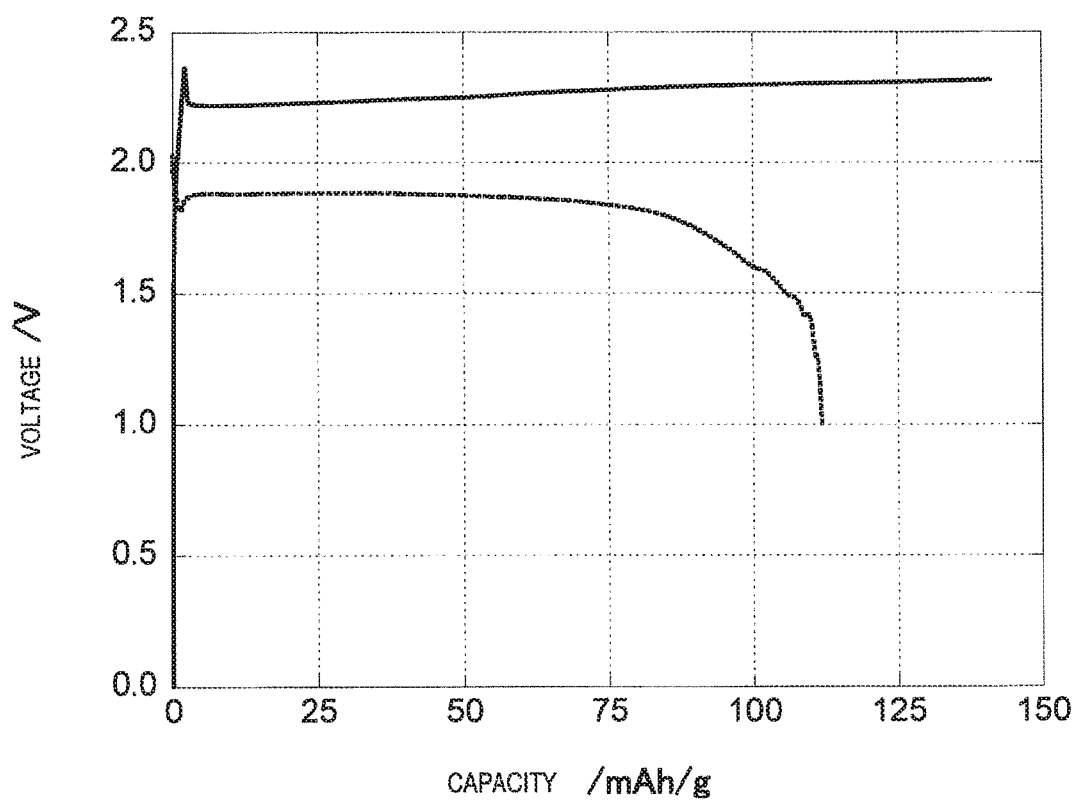
FIG. 5 shows a capacity-voltage variation which occurred when a battery consisting of a Ag plate electrode and a magnesium chloride ($MgCl_2$) electrode was charged and discharged with a constant current.

In FIG. 5, the solid line represents the charge curve, and the dotted line represents the discharge curve.

Flat part of the discharge curve was 1.88 V, which is close to the potential difference between formula (23) and formula (24), 1.93 V. Therefore, it can be seen that charging or discharging the assembled battery causes transfer of chlorine ions between the positive electrode and the negative electrode.

Note that the overvoltage is somewhat larger in charging probably because MgCl$_2$ is electrically insulative and is unlikely to release chlorine ions (Cl⁻).

Example 5

The present inventors verified that an electrolytic solution which has chlorine ion (Cl⁻) conductivity can be prepared even if the content of an organic solvent decreases.

Firstly, for the sake of comparison, an electrolytic solution which did not include lithium chloride (LiCl) was prepared. Lithium bis(trifluoromethanesulfonyl)imide (abbreviated as LiTFSI; manufactured by KISHIDA CHEMICAL Co., Ltd.) and tetrahydrofuran (abbreviated as THF; manufactured by Wako Pure Chemical Industries, Ltd.) were mixed together in a molar ratio of LiTFSI:THF=4:5. Polyethylene glycol dimethyl ether (abbreviated as PEGDME; manufactured by Alfa Aesar) whose molecular weight was 1000 was added so as to constitute 8 wt % of the total mixture, and stirred. The solution was a single-phase, transparent liquid although it was viscous and thick.

To this comparative electrolytic solution, lithium chloride (manufactured by Aldrich) was added in a molar ratio of LiCl:LiTFSI=1:4, and stirred. Lithium chloride (2.5 wt % of the total mixture) was not completely dissolved, resulting in a milky solution.

The working electrode used was a bismuth (Bi) wire with a diameter of about 1 mm (manufactured by Alfa Aesar). Two nickel net collectors covered with lithium foil (manufactured by Honjo Metal Co., Ltd.) were prepared and used as the reference electrode and the counter electrode.

The three electrodes were immersed in the comparative electrolytic solution, and cyclic voltammetry was performed. Measurement conditions were the sweep rate of 1 mV/sec and the sweep range of 1.7 to 4.2 V.

Figure 6:
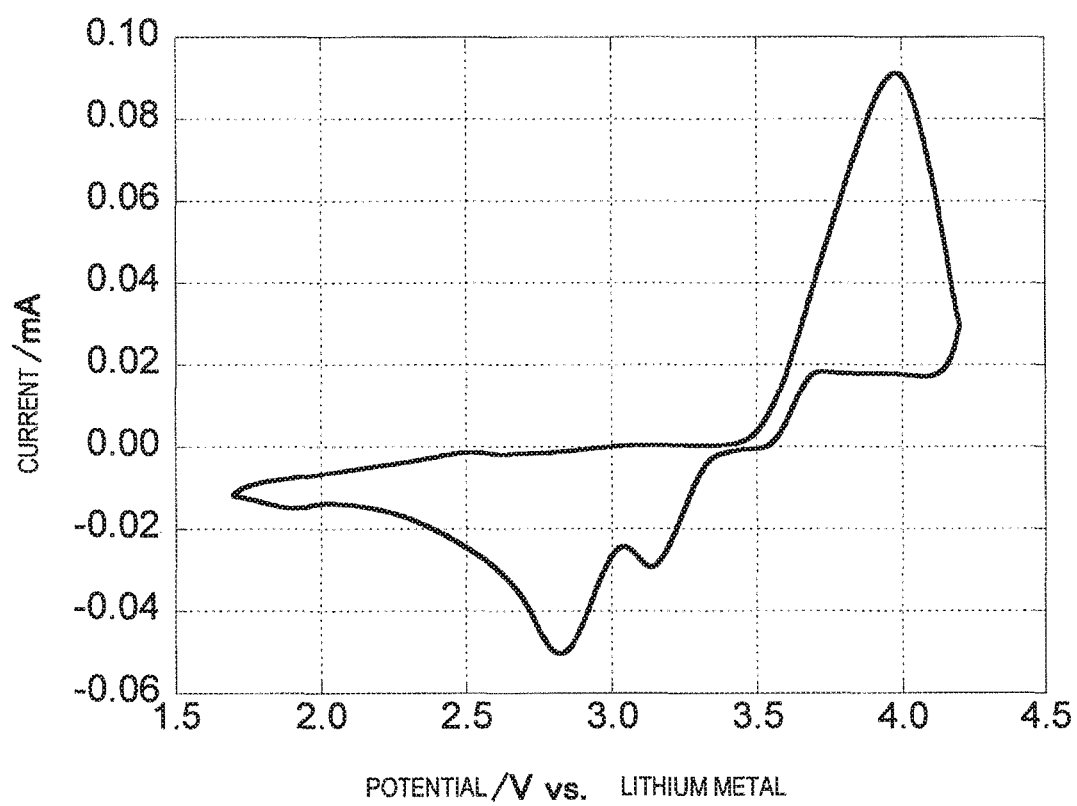
FIG. 6 shows a potential-current variation which occurred when cyclic voltammetry of a Bi wire was carried out in a LiTFSI/THF/PEGDME solution.

FIG. 6 shows a record of waveforms of the third cycle in the cyclic voltammetry. It can be seen that, in the comparative electrolytic solution, an oxidation current starts to flow at 3.4 V or higher, and a reduction current corresponding to the oxidation current also flows. That is, it can be seen that, in an electrolytic solution which does not include LiCl, a Bi metal is oxidized at 3.4 V or higher.

Figure 7:
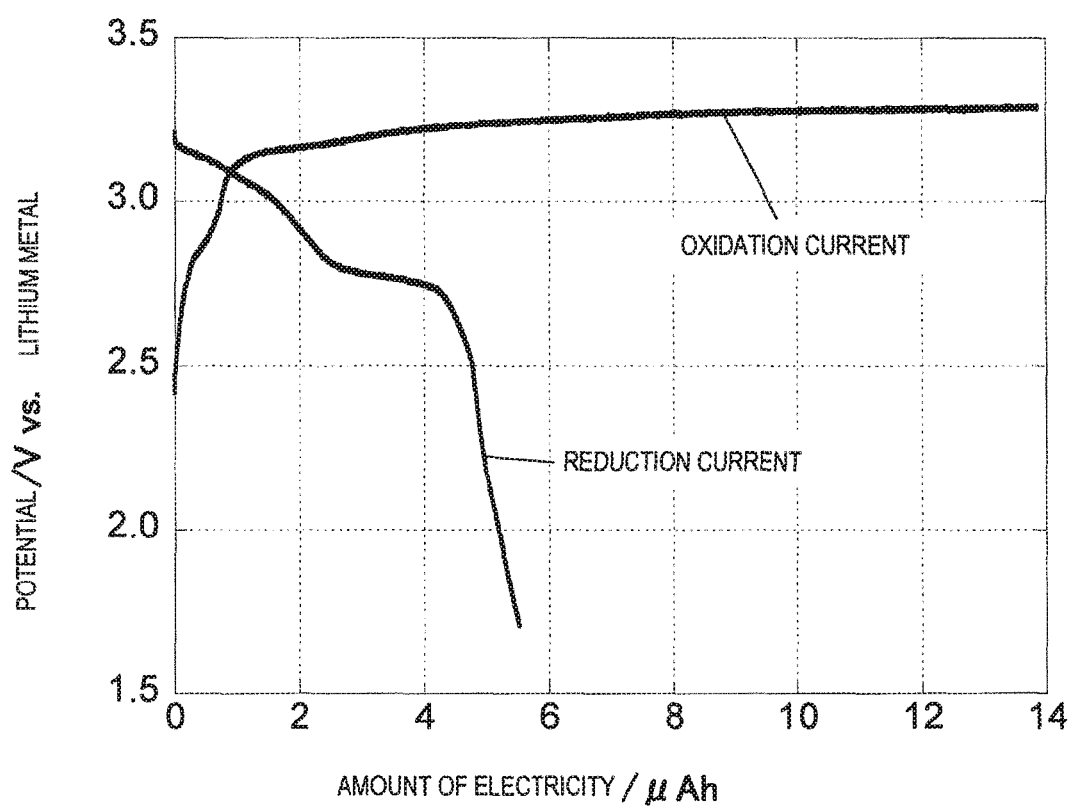
FIG. 7 shows a capacity-potential variation which occurred when constant current oxidation and reduction of a Bi wire were carried out in a LiCl/LiTFSI/THF/PEGDME solution.

Next, the three electrodes were immersed in an electrolytic solution in which LiCl was dispersed. An oxidation current of 2 µA was supplied to flow till the potential of the working electrode reached 3.3 V, and then, a reduction current of 2 µA was supplied to flow till the potential of the working electrode reached 1.7 V. FIG. 7 shows a record of the potential variation at the working electrode in the tenth cycle of that process. An electric current flowed such that the Bi metal was oxidized before the potential of the working electrode reached 3.3 V (red line in FIG. 7), and a corresponding reduction current flowed (blue line in FIG. 7). Thus, it can be appreciated that part of dispersed LiCl was dissolved to dissociate, and chlorine ions (Cl$^-$) transferred to and from the Bi metal.

Example 6

The present inventors verified that chlorine ions (Cl$^-$) can transfer to and from a copper (Cu) metal with the use of the electrolytic solution used in Example 5 in which lithium chloride (LiCl) was dispersed.

The working electrode used was a Cu wire with a diameter of about 1 mm (manufactured by The Nilaco Corporation). Two nickel net collectors covered with lithium foil (manufactured by Honjo Metal Co., Ltd.) were prepared and used as the reference electrode and the counter electrode.

Figure 8:
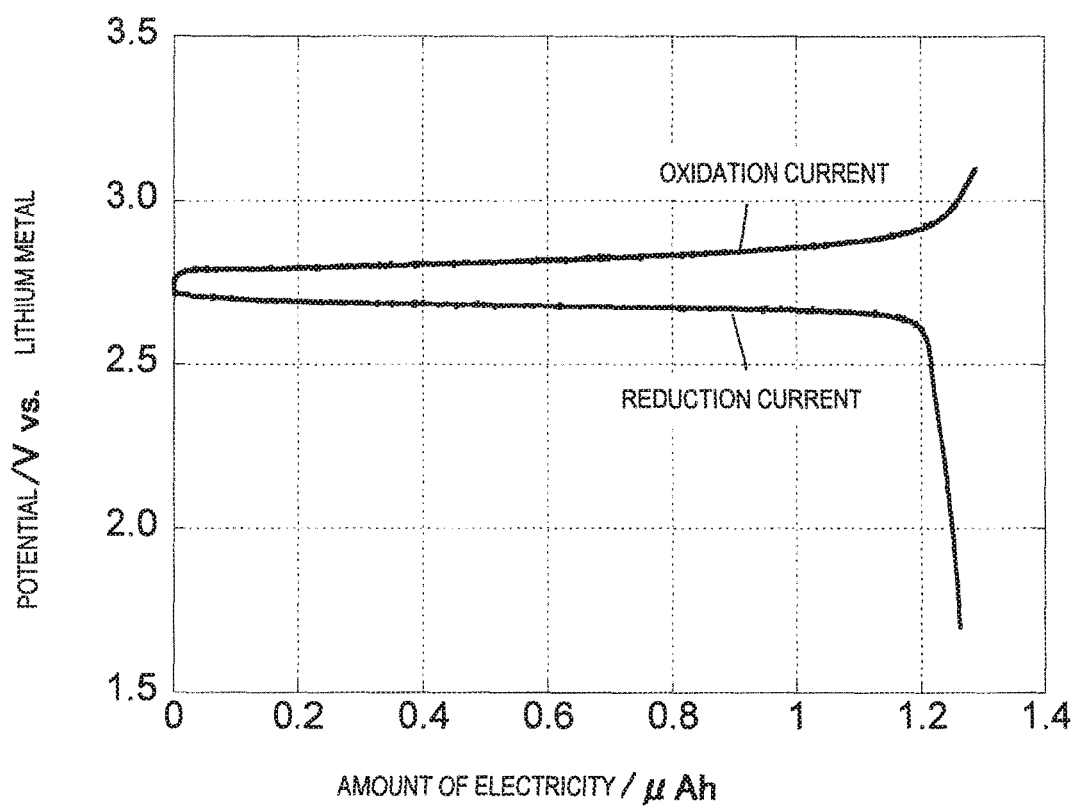
FIG. 8 shows a capacity-potential variation which occurred when constant current oxidation and reduction of a Cu wire were carried out in a LiCl/LiTFSI/THF/PEGDME solution.

The three electrodes were immersed in an electrolytic solution in which LiCl was dispersed. An oxidation current of 2 µA was supplied to flow till the potential of the working electrode reached 3.1 V, and then, a reduction current of 2 µA was supplied to flow till the potential of the working electrode reached 1.7 V. FIG. 8 shows a record of the potential variation at the working electrode in the tenth cycle of that process (the red line represents the potential variation which occurred when the oxidation current was flowing, and the blue line represents the potential variation which occurred when the reduction current was flowing). It can be seen from FIG. 8 that a reaction corresponding to formula (2') shown below occurred, and chlorine ions (Cl$^-$) transferred to and from the Cu metal.

$$2.74\ V: CuCl + Li^+ + e \Leftrightarrow Cu + LiCl \quad (2')$$

Example 7

The present inventors verified that an electrolytic solution in a slurry form can be prepared using lithium chloride (LiCl), lithium bis(trifluoromethanesulfonyl)imide (abbreviated as LiTFSI), and tetrahydrofuran (abbreviated as THF), and this slurry electrolytic solution has chlorine ion (Cl$^-$) conductivity.

LiCl (manufactured by Aldrich), LiTFSI (manufactured by KISHIDA CHEMICAL Co., Ltd.), and THF (manufactured by Wako Pure Chemical Industries, Ltd.) were mixed together in the following molar ratios and stirred.
(i) 20:1:3
(j) 20:1:2
(k) 20:1:1.5

In each of the mixture ratios, the mixture included solid LiCl and was white in color. In mixture ratio (i), the mixture was such a milky liquid that a dropper could draw in. In mixture ratio (j), the mixture was in a cream form which had low fluidity and could be gathered by a spatula. In mixture ratio (k), the mixture could be gathered by a spatula but had substantially no fluidity.

In a mock battery case (manufactured by EC Frontier Co, Ltd.), a silver chloride (AgCl) plate electrode and a silver (Ag) plate electrode were arranged so as to oppose each other, and a polyethylene net of 200 meshes impregnated with the above-described slurry electrolytic solution (i) was provided between the electrodes. Note that the AgCl plate was formed by supplying an oxidation current of 3 mAh/cm$^2$ so as to flow through a Ag plate immersed in a NaCl aqueous solution. In the thus-assembled AgCl//Ag mock battery, an oxidation current of 10 ρA/cm$^2$ was supplied to flow through the Ag plate electrode, and the variation in cell voltage (=Ag electrode−AgCl electrode) was examined.

Figure 9:
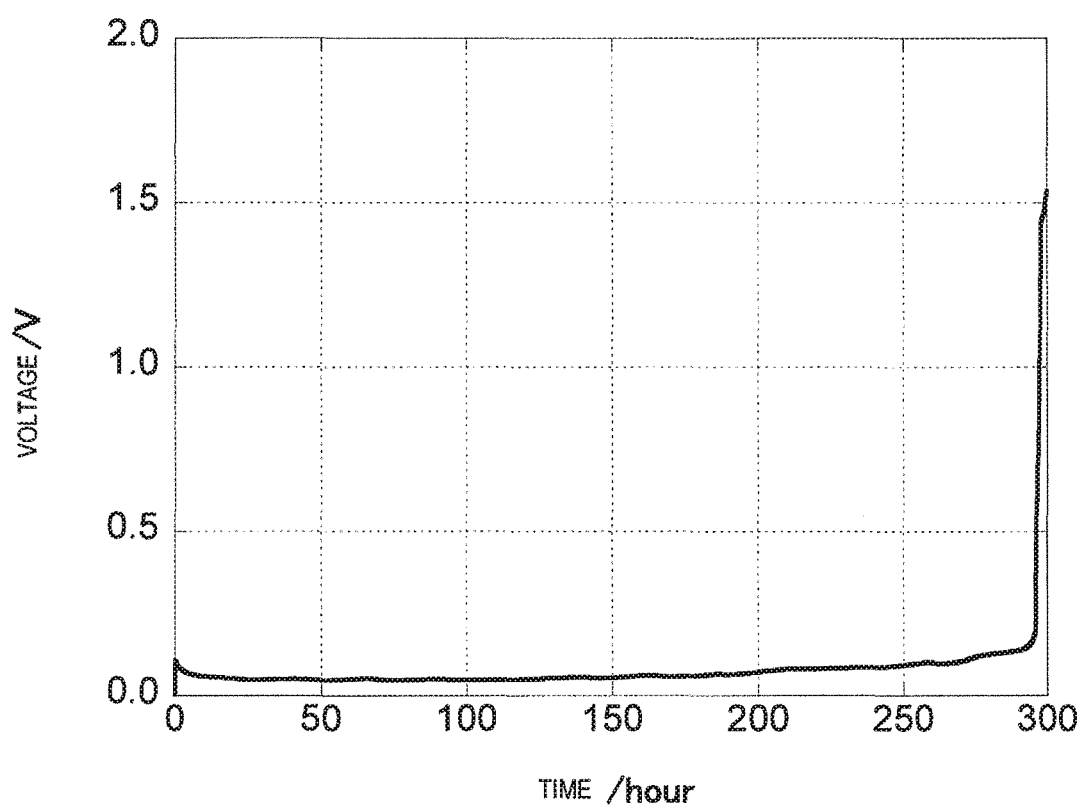
FIG. 9 shows a time-voltage variation which occurred when, in a battery consisting of a AgCl plate electrode and a Ag plate electrode, an oxidation current was supplied to flow through the Ag plate electrode using a LiCl/LiTFSI/THF slurry.

FIG. 9 shows a record of the voltage variation in the examination. The voltage was zero (0) before passage of about 300 hours and thereafter sharply increased. Disassembling and examining the battery, it was found that Ag was produced at the AgCl electrode and AgCl was produced at the Ag electrode. Therefore, it can be seen that electrolytic solution (i) has Cl$^-$ conductivity.

The same experiment was also carried out on the slurry electrolytic solutions (j) and (k), and it was verified that they had Cl$^-$ conductivity.

Example 8

The slurry electrolytic solution (j) prepared in Example 7 was used. It was verified that nanoparticles of copper (Cu) take in chlorine ions (Cl$^-$) by oxidation.

Lithium chloride (LiCl; manufactured by Aldrich), nanoparticles of Cu (manufactured by Aldrich; 40 to 60 nm in diameter), acetylene black (abbreviated as AB; manufactured by Denka Company Limited), and polytetrafluoroethylene resin (abbreviated as PTFE; manufactured by DAIKIN INDUSTRIES, LTD.) were mixed and rolled out, whereby the working electrode was formed. Here, the molar ratio of LiCl:Cu was 2:1, the content of AB was 40 wt %, and the content of PTFE was 10 wt %.

The counter electrode was a silver chloride (AgCl) plate of 6 mAh/cm$^2$, which was formed in the same way as Example 7.

In a mock battery case (manufactured by EC Frontier Co, Ltd.), the working electrode and the counter electrode were arranged so as to oppose each other, and a polyethylene net of 200 meshes impregnated with the above-described slurry electrolytic solution (j) was provided between the electrodes. In the thus-assembled AgCl//Cu mock battery, an oxidation current of 10 μA/cm² was supplied to flow through the working electrode, and the variation in cell voltage (=Cu electrode−AgCl electrode) was examined.

Figure 10:
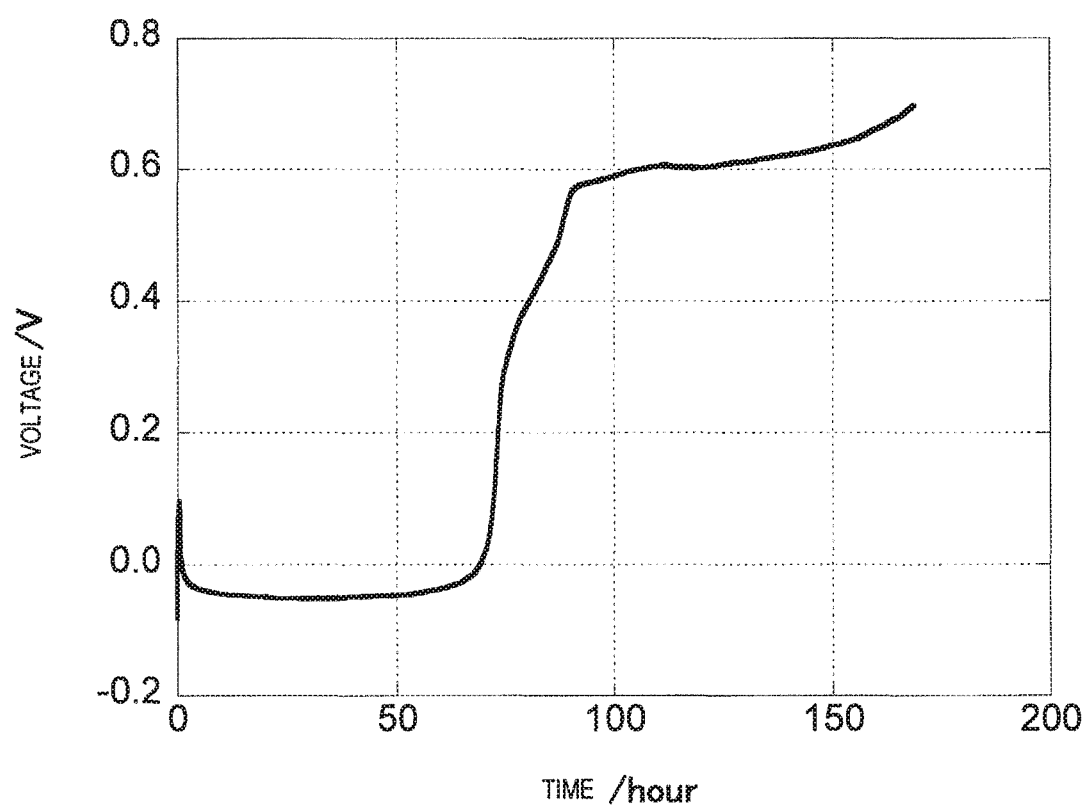
FIG. 10 shows a time-voltage variation which occurred when, in a battery consisting of a AgCl plate electrode and a Cu powder electrode, an oxidation current was supplied to flow through the Cu powder electrode using a LiCl/LiTFSI/THF slurry.

FIG. 10 shows a record of the voltage variation in the examination. Reactions corresponding to the reaction formulae shown below can be seen with an overvoltage of about 50 mV. Therefore, it can be seen that Cu powder took in Cl⁻.

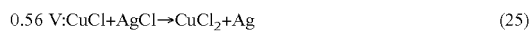  (25)

  (26)

Note that after charging the working electrode was analyzed by X-ray diffraction, but we failed to detect $CuCl_2$ because particles were extremely fine.

Although in Examples 1 to 8 LiTFSI was used for the lithium imide, basically the same effects can also be achieved when a lithium imide represented by $Li(XSO_2NSO_2Y)$ (where X and Y are any of F, $C_nF_{2n+1}$ and $(CF_2)_m$, and $(CF_2)_m$ forms a cyclic imide anion) is used.

The electrochemical energy storage device disclosed in the present application is useful as a power supply for smartphones, cell phones, portable information devices, personal computers, video cameras, handheld game consoles, etc. Also, the electrochemical energy storage device disclosed in the present application can be used as a power supply for driving electric tools, cleaners, robots, etc., or as a power supply for driving or supporting an electric motor of hybrid electric cars, plug-in hybrid electric cars, fuel cell powered cars, etc.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2015-024305 filed on Feb. 10, 2015, the entire contents of which are hereby incorporated by reference.

What is claimed is:

1. An electrochemical energy storage device, comprising:
a positive electrode including a positive electrode active material;
a negative electrode including a negative electrode active material; and
a non-aqueous electrolytic solution including LiCl, at least one of $Li(XSO_2NSO_2Y)$ (where X and Y are any of F, $C_nF_{2n+1}$ and $(CF_2)_m$, and $(CF_2)_m$ forms a cyclic imide anion) and $LiBF_4$, and at least one of tetrahydrofuran and a polyethylene glycol of which both terminals are alkyl groups, the non-aqueous electrolytic solution being in contact with the positive electrode and the negative electrode,
wherein the positive electrode active material includes a chloride of Cu, Bi or Ag, or the negative electrode active material includes magnesium chloride, and
a charge carrier between the positive electrode and the negative electrode is a chlorine ion.

2. The electrochemical energy storage device of claim 1, wherein the positive electrode active material includes $CuCl_2$, CuCl, AgCl or $BiCl_3$.

3. The electrochemical energy storage device of claim 1, wherein the negative electrode active material includes $MgCl_2$.

4. The electrochemical energy storage device of claim 1, wherein in the non-aqueous electrolytic solution, a molar ratio of LiCl to all lithium salts except for LiCl, including at least one of $Li(XSO_2NSO_2Y)$ and $LiBF_4$, is not more than 20.

5. The electrochemical energy storage device of claim 1, wherein in the non-aqueous electrolytic solution, all lithium salts including LiCl and at least one of $Li(XSO_2NSO_2Y)$ and $LiBF_4$ are dissolved in the non-aqueous electrolytic solution.

6. The electrochemical energy storage device of claim 5, wherein
the non-aqueous electrolytic solution includes $Li(CF_3SO_2)_2N$ and tetrahydrofuran, and
a molar ratio of LiCl, $Li(CF_3SO_2)_2N$ and tetrahydrofuran is 1:4:20.

7. The electrochemical energy storage device of claim 5, wherein
the non-aqueous electrolytic solution includes $LiBF_4$ and tetrahydrofuran, and
a molar ratio of LiCl, $LiBF_4$ and tetrahydrofuran is 1:7:20.

8. The electrochemical energy storage device of claim 1, wherein in the non-aqueous electrolytic solution, LiCl is solid.

9. The electrochemical energy storage device of claim 8, wherein
the non-aqueous electrolytic solution includes $Li(CF_3SO_2)_2N$ and tetrahydrofuran, and
a molar ratio of LiCl, $Li(CF_3SO_2)_2N$ and tetrahydrofuran is 20:s:t (where s and t are in the ranges of $1.0 \leq s$ and $1.5 \leq t \leq 3.0$).

10. An electrochemical energy storage device, comprising:
a positive electrode including a positive electrode active material;
a negative electrode including a negative electrode active material; and
a non-aqueous electrolytic solution including LiCl, at least one of $Li(XSO_2NSO_2Y)$ (where X and Y are any of F, $C_nF_{2n+1}$ and $(CF_2)_m$, and $(CF_2)_m$ forms a cyclic imide anion) and $LiBF_4$, and at least one of tetrahydrofuran and a polyethylene glycol of which both terminals are alkyl groups, the non-aqueous electrolytic solution being in contact with the positive electrode and the negative electrode,
wherein the negative electrode active material includes magnesium chloride, and
a charge carrier between the positive electrode and the negative electrode is a lithium ion.

* * * * *